Nov. 12, 1929.  J. B. KILBURN  1,735,320
CAR SEAT
Filed July 2, 1926   6 Sheets-Sheet 1

Nov. 12, 1929.  J. B. KILBURN  1,735,320
CAR SEAT
Filed July 2, 1926   6 Sheets-Sheet 3

INVENTOR
John B. Kilburn
BY
ATTORNEY

Nov. 12, 1929.  J. B. KILBURN  1,735,320
CAR SEAT
Filed July 2, 1926  6 Sheets-Sheet 4
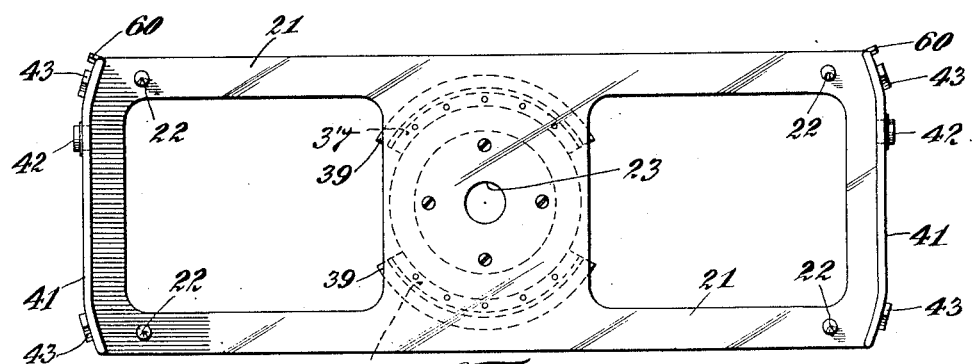
Fig. 4.
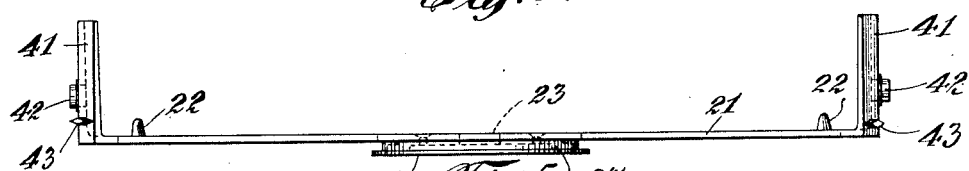
Fig. 5.
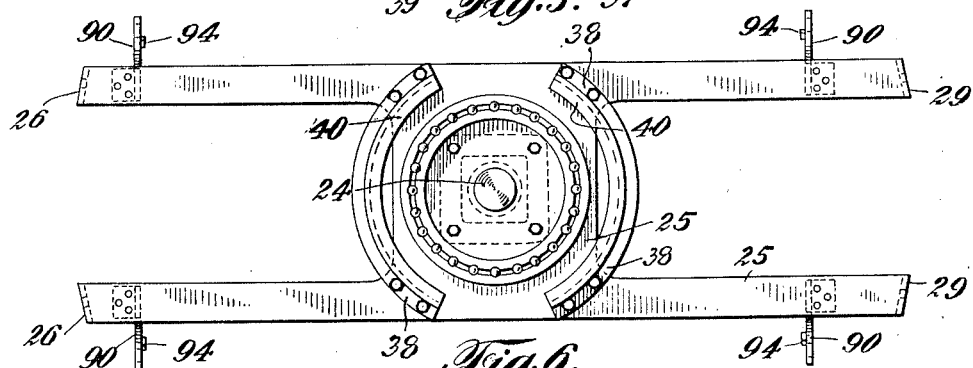
Fig. 6.
Fig. 7.
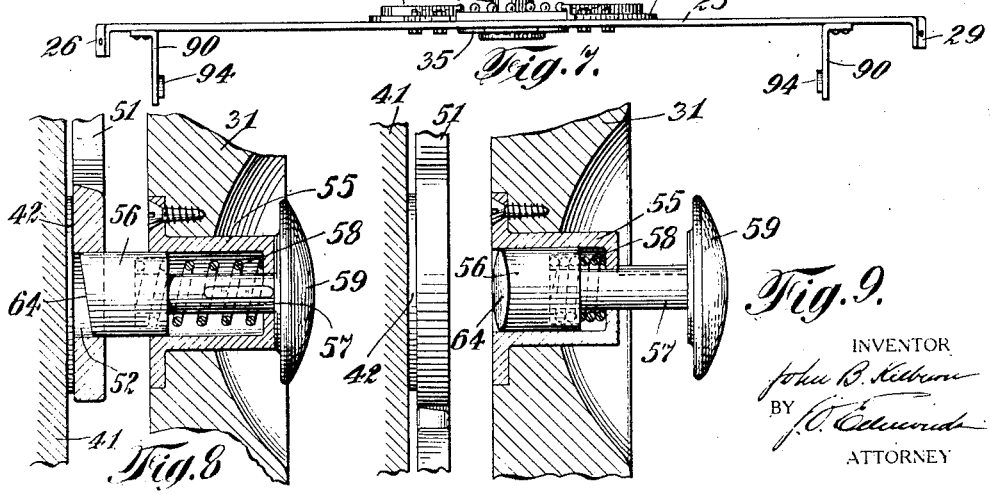
Fig. 8.  Fig. 9.
INVENTOR
John B. Kilburn
BY
ATTORNEY Nov. 12, 1929.  J. B. KILBURN  1,735,320
CAR SEAT
Filed July 2, 1926    6 Sheets-Sheet 5
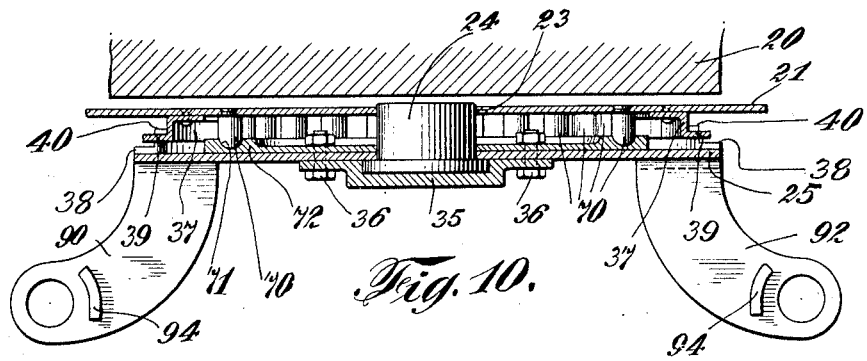
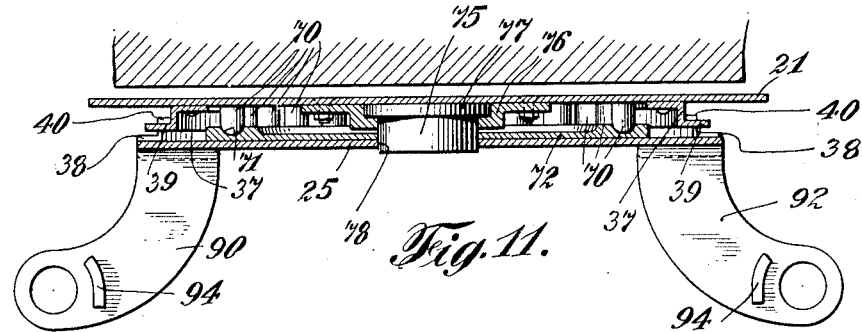
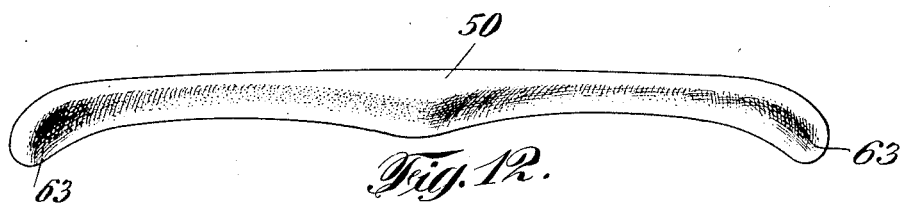
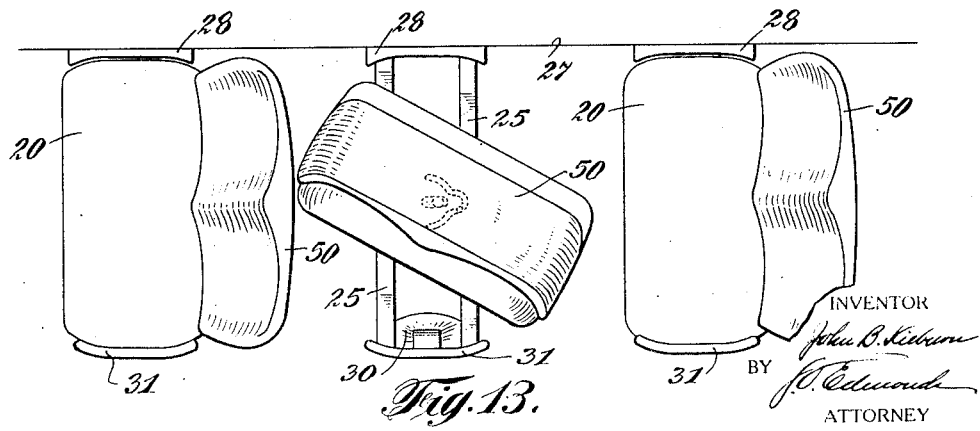

Nov. 12, 1929.   J. B. KILBURN   1,735,320
CAR SEAT
Filed July 2, 1926   6 Sheets-Sheet 6

INVENTOR
John B. Kilburn
BY J. C. Edmonds
ATTORNEY

Patented Nov. 12, 1929

1,735,320

UNITED STATES PATENT OFFICE

JOHN B. KILBURN, OF OCEAN CITY, NEW JERSEY

CAR SEAT

Application filed July 2, 1926. Serial No. 120,078.

This invention relates to car seats, and more particularly relates to seats for railway and tram coaches as distinguished from parlor cars, club cars, observation cars, and the like, and relates to seats which may be revolved in a horizontal plane to face toward either end of the coach.

The most salient problems to be met in this art include providing a coach with seating accommodation for a maximum number of passengers; making the seats comfortable, steady and sturdy; arranging them so that they may be faced toward either end of the car, since most passengers object to riding backwards; arranging for the easy and convenient reversal of the seats by the trainmen; and providing seats which have an appearance creating an impression of attractiveness, comfortableness, and security.

Customarily, each seat designed for railroad coaches has been built to accommodate two passengers sitting side by side. The most popular type of seats has been adapted to be reversed by moving the seat back over to the other side, the seat cushion from one side to the other, with the accompanying movement of the seat cushion in a reverse direction to the movement of the seat back. Some coaches have also been equipped with stationary seats not adapted for reversal. The form of construction and method of reversal of the reversible seats as heretofore made has prevented their equipment with deep and luxurious upholstery and cushions and backs having the most comfortable shape and pitch. Stationary seats have permitted deep and luxurious upholstery, but have forced the occupant to ride backwards when the coach is traveling one way.

The advent of the modern automobile has furnished a more luxurious mode of transportation in competition with the steam and electric railway cars, thus creating a demand for a more luxurious type seat for those vehicles.

The principal object of my invention is to provide a seat for railway and tram coaches, and the like, which overcomes the above noted objectionable features of reversible coach seats and stationary coach seats, and at the same time to provide a coach seat which meets the problems above mentioned in a satisfactory and efficient manner. In short, the principal object of my invention is to provide a coach seat which embodies greater ease and comfort than any heretofore produced, and at the same time conserves seating space to the utmost, and permits facing in different directions.

A further object of my invention is to provide a coach seat of the character described, which is simple, sturdy and durable in construction, and easy to install in a railway coach, tram car, or the like.

Other objects of my invention will be in part obvious and in part pointed out hereinafter.

All forms of seats which reverse backward and forward necessarily use comparatively thin cushions and thin backs, since the spring and upholstery space is so limited that a very comfortable seat cannot be made without making the seat so large that it will objectionably limit the number of seats per coach. To overcome this difficulty, I have eliminated this reversing feature, and instead have constructed my seat so that it may be revolved in a horizontal plane, permitting it to be faced in either direction in which the car is traveling.

The ordinary parlor car chair also revolves in a horizontal plane, but it takes up a great deal of space, permitting usually no more than twenty-five single seats per car, as compared with seventy-two to eighty seats in the ordinary passenger coach. In contrast with this, my seat is of such construction that it will accommodate two passengers comfortably side by side, and will occupy so little space in the coach that comfortable seating accommodations may be provided in the ordinary passenger coach for the usual number of passengers, that is, seventy-two to eighty.

The ease and comfort of the seat depends to a great extent on the depth of the springs and upholstery and the pitch of both the cushion and the back. To obtain maximum ease and comfort, the cushion and seat back must remain relatively in the same position, whichever way the seat is facing. To permit revolving seats having great depth of springs and upholstery and comfortable pitch for both cushion and back when the seats are mounted close enough together to accommodate the usual number of passengers in a coach, some arrangement must be made to avoid interference with an adjacent seat, due to the width of the cushion, or the overhang of the top edge of the back due to its pitch or inclination, or both. It is also necessary to avoid interference between the ends of the cushion and back and the car wall, or with a stationary aisle end at the center aisle of the coach. To avoid interference between the seat back and the adjacent seat, as well as with the car wall or a stationary aisle end, I preferably mount the seat back for limited tilting movement with respect to the cushion, so that the top edge of the back may be brough into alignment over the seat cushion and will pass the adjacent stationary parts and the wall of the car without striking. To avoid interference of the cushion with the adjacent seat, car wall and stationary aisle end, I propose to construct the aisle armrest of the seat with a somewhat circular shape and the ends of the cushion rounded to conform thereto. I propose to mount the cushion and back on a pivot which shifts longitudinally of the car, so that when the seat is revolved, it will be transposed bodily away from an adjacent seat a sufficient distance to avoid interference therewith. If desired, the stationary aisle end may be eliminated, and the seat may either lack end plates entirely, or end plates may be secured to the seat cushion for revolution therewith. The seat cushion may be supported for revolution either on a central pedestal or on cross rails, secured at one end to the car wall, or to a pedestal thereat, and at the other end to a pedestal at the aisle end of the seat.

Preferably, locking means are provided which prevent the seat from being revolved after it has been turned to face either end of the car. These means may be connected with the seat back so as to become released when the seat back is tilted preparatory to revolving the seat.

In order that a clearer understanding of my invention may be had, attention is hereby directed to the accompanying drawings, forming a part of this application and illustrating certain possible embodiments of my invention.

Referring to the drawings.

Figure 1:
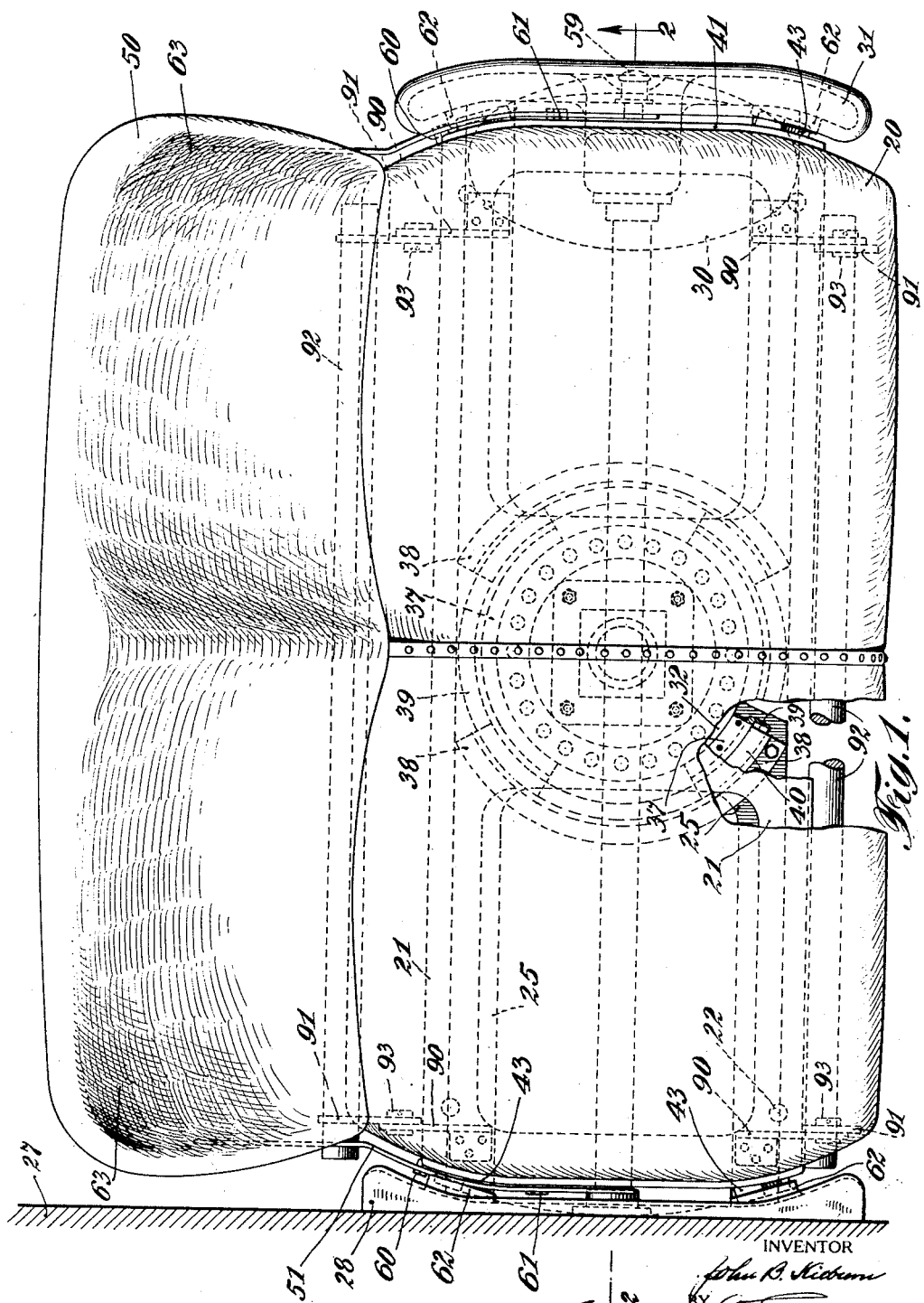
Fig. 1 is a top view of a seat embodying my invention, partly broken away, and showing the location of various parts in dotted lines to more clearly bring out the construction.
Figure 2:
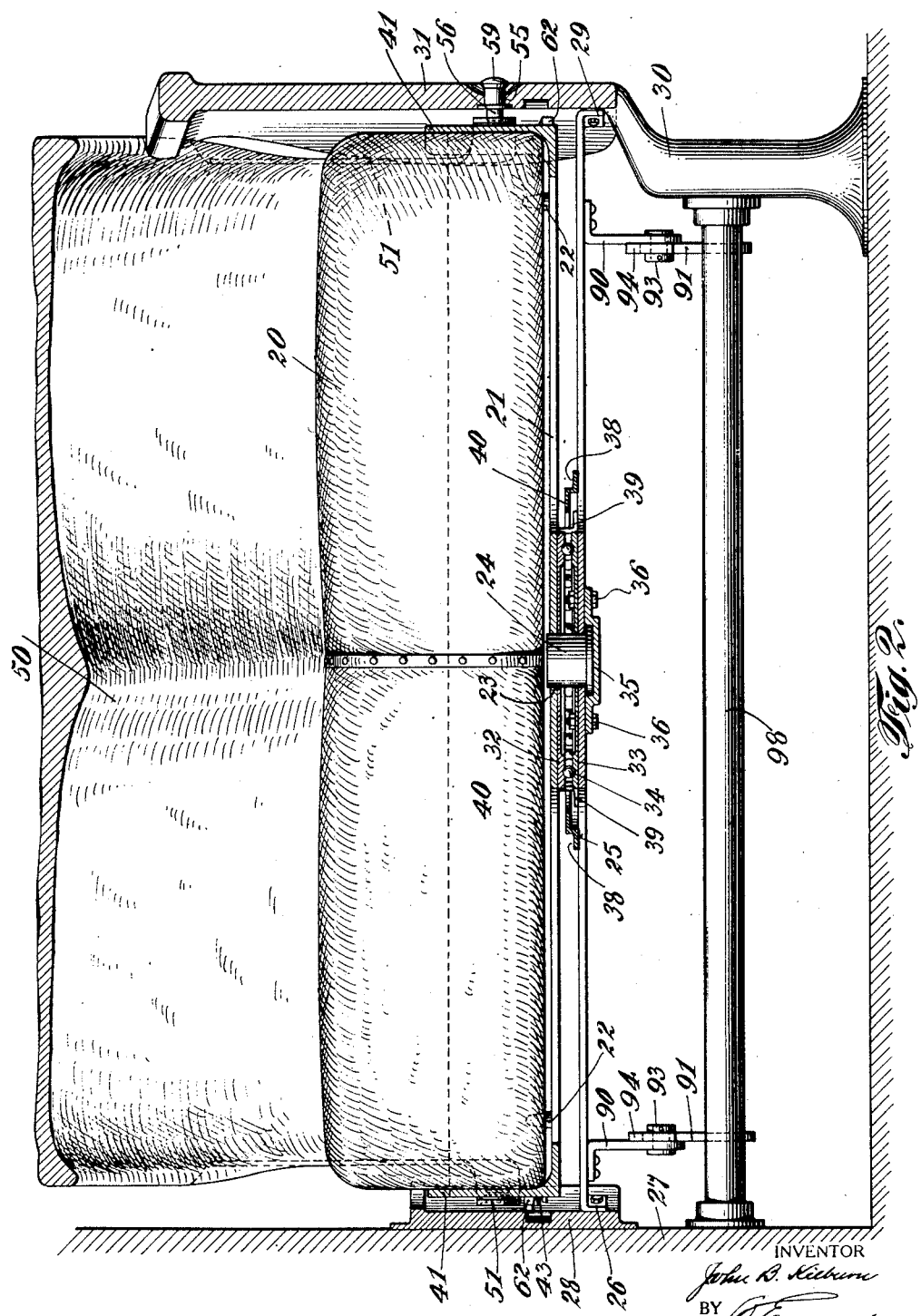
Fig. 2 is a vertical longitudinal sectional view of the seat, and is taken on the line 2—2 of Fig. 1.
Figure 3:
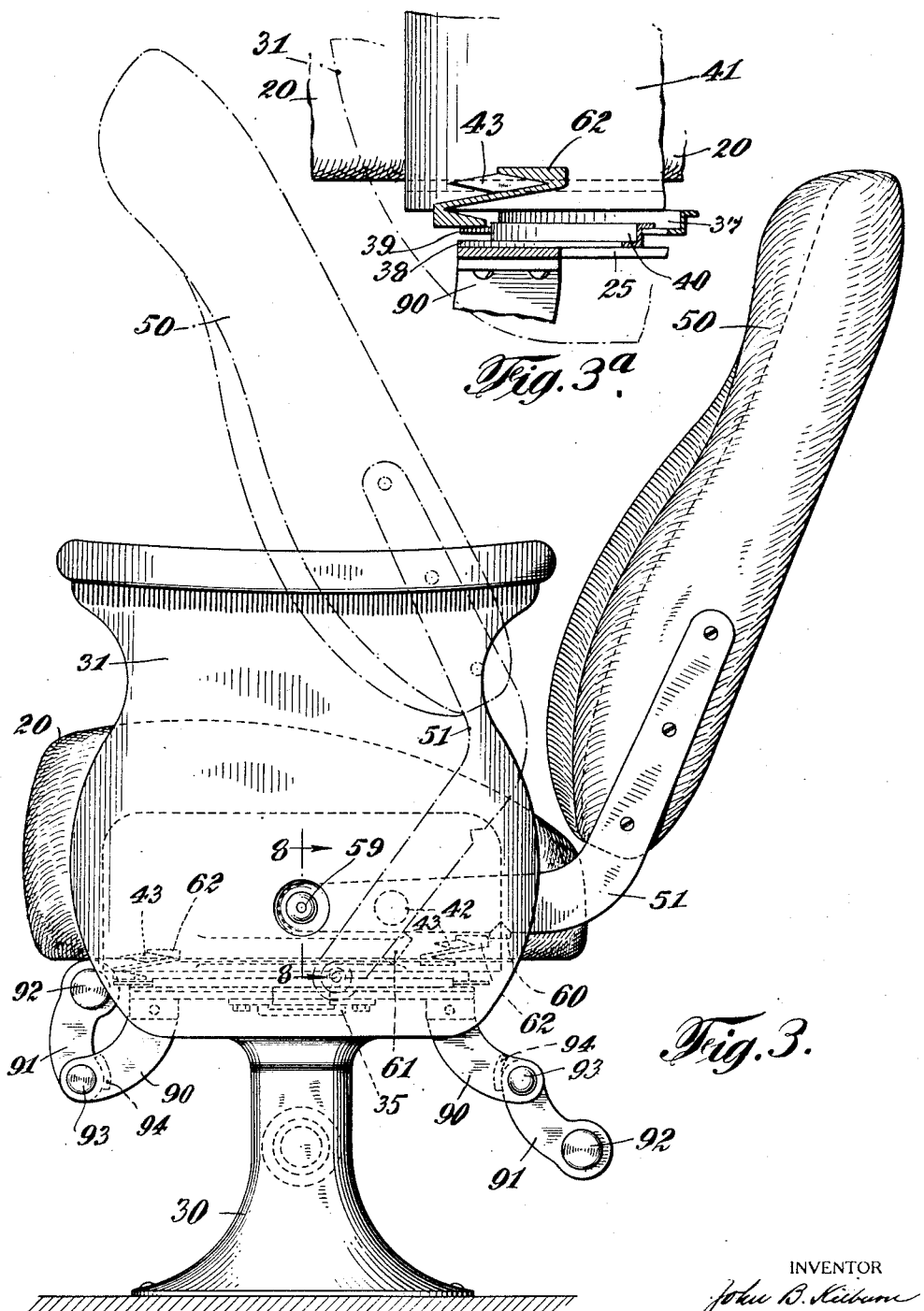
Fig. 3 is an end view of the seat, showing in dot and dash lines the seat back in tilted position.
Figure 14:
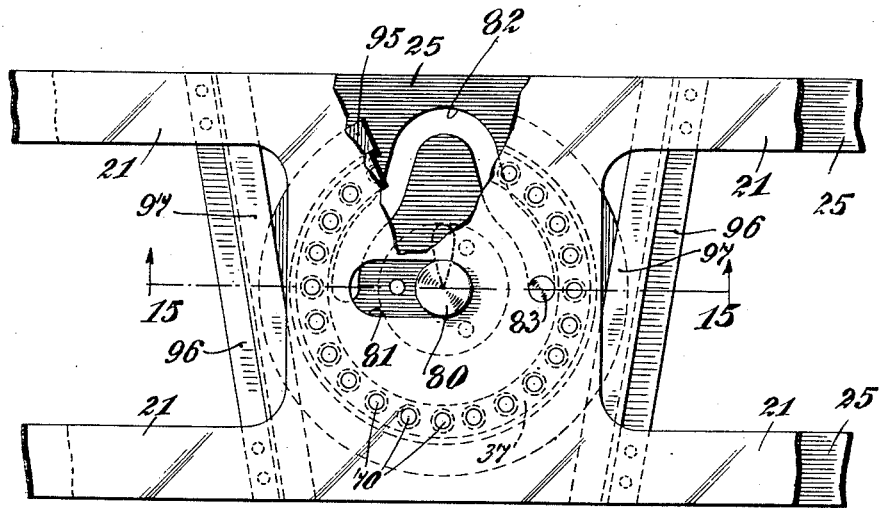
Figure 15:
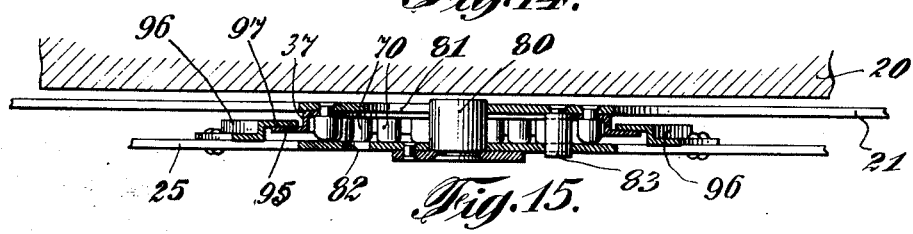
Figure 16:
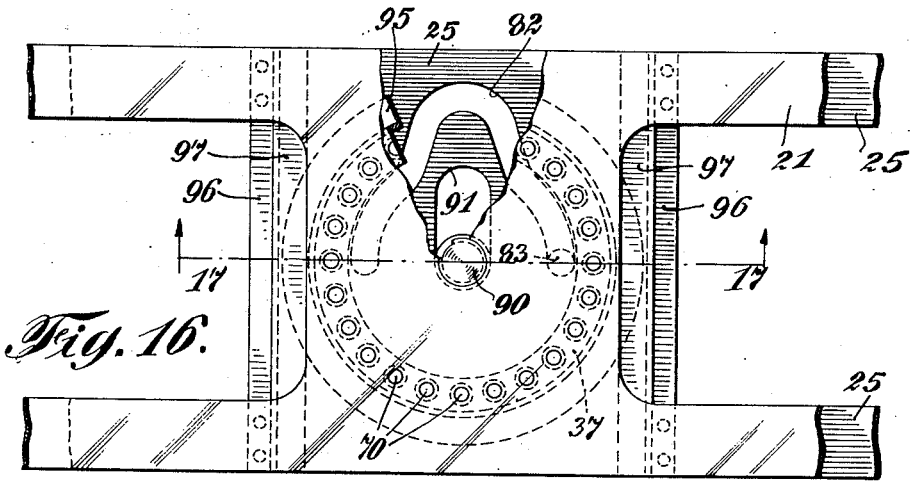
Figure 17:
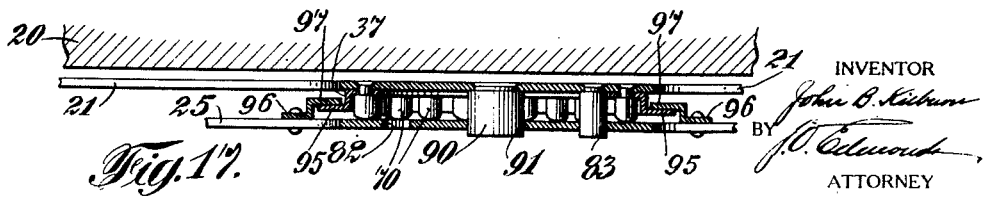

Fig. 3ª is an enlarged sectional view of a fragment thereof;

Fig. 4 is a top plan view of the cushion rest, which revolves with the cushion;

Fig. 5 is a side view of the same;

Fig. 6 is a top plan view of the seat frame, on which the cushion rest revolves;

Fig. 7 is a side view thereof;

Figs. 8 and 9 are enlarged sectional views of details of the construction, showing the means for latching the seat in position, Fig. 8 showing the parts latched together, and Fig. 9 showing the parts released, Fig. 8 being taken on the line 8—8 of Fig. 3;

Fig. 10 is an enlarged transverse sectional view through the pivot and parts adjacent thereto, showing a modified manner of mounting the parts;

Fig. 11 is a view similar to Fig. 10, showing another modification of this mounting;

Fig. 12 is a top view of the seat back;

Fig. 13 is a diagrammatical view, showing the location of a plurality of seats in a line, with a center seat in an intermediate position of revolution, and showing this center seat transposed bodily away from an adjacent seat, the back of which inclines toward the seat that is being revolved;

Fig. 14 is an enlarged top plan view of a fragment of a modified construction, including a fragment of the cushion rest and a fragment of the support therefor, and showing means for moving the cushion rest bodily with respect to the support when the cushion rest is revolved thereon;

Fig. 15 is a sectional view thereof, and is taken on the line 15—15 of Fig. 14;

Fig. 16 is a view similar to Fig. 14 of a modified construction, the king pin in this instance being rigidly fixed to the cushion support; and Fig. 17 is a sectional view thereof, and is taken on the line 17—17 of Fig. 16.

Similar reference characters refer to similar parts throughout the several views of the drawings.

Referring to the drawings, Figs. 1 to 7, inclusive, bring out the construction of one form of seat. This seat includes a seat cushion 20, having great depth of spring work and upholstery, and being considerably thicker at the front edge than at the rear, which is the well-known design of a cushion giving maximum comfort and ease. This cushion is mounted on a cushion rest 21, which comprises a flat frame of suitably rigid and preferably light material. This frame 21 fits underneath the cushion and has dowel pins 22 in engagement therewith, so that the cushion and cushion rest will rotate together. At the center of the cushion rest is a perforation 23, through which extends a stud 24, which is mounted on a frame 25. One end 26 of frame 25 is secured to the car wall 27 or to an end plate 28 secured to this wall. The other end 29 of frame 25 is secured to an aisle pedestal 30 or to an end plate 31 mounted on this pedestal. Frame 25 is made of sturdy and rigid material, which, however, is preferably of light weight. Members 21 and 25 may have secured thereto complementary members 32 and 33, establishing a ball race for ball bearings 34, to reduce friction on the relative movement between these members as the cushion rest 21 revolves about the pin 24. Pin 24 may be secured in place by means of a cover or yoke 35, which is bolted to the frame 25, as at 36, beneath the pin. Preferably, two flange members 37 are secured to the underside of the cushion rest 21, and two complementary flange members 38 are secured to the upper side of frame 25, so that the flanges 39 will engage beneath the flanges 40 of the members 38 when the seat is being turned in either direction, to prevent the cushion rest 21 from being raised from the frame 25, and to prevent the seat from tipping.

Each end of the cushion rest 21 has upwardly extending portions 41, and each portion 41 is provided with a pin or stud 42 and with a pair of outwardly projecting wedge members 43 of diamond shape, not at the same height.

The seat back 50 is made with great depth of upholstery and spring work and with scientifically designed contour to give maximum comfort and ease. The seat back is supported at each end by an angular standard 51, which has one arm secured to the seat back and the other arm pivoted to the cushion rest 21 on the studs 42.

On the aisle end 31 is mounted a housing 55, in which is mounted a latch pin 56, which has a reduced portion 57, around which a coil spring 58 is compressed between the outer end of the housing and the latch head to constantly urge the latch outwardly. Latch 56 has a head 59 on the outside of the aisle end 31, whereby the latch may be released. The end of each back standard 51 is provided with a recess or perforation 52, which aligns with latch 56 when the seat back is in normal position and the seat is facing toward one end of the car. This latch thus holds the seat back against being tilted forwardly and also holds the seat cushion against turning.

Suitable stops 60 are provided at each end of the seat to limit downward movement of the back standards 51 and to take the strain off the latch 56. Other stops 61 are also provided to limit the amount the seat back may be tilted over the seat cushion.

The wall end plate 28 and the aisle end 31 are provided with Z-shaped members 62 at different heights and each having an upper and a lower recess, facing in opposite directions, in which the wedge members 43 engage when the seat is in either final position, thus placing the strain on these end plates rather than on the center of the cushion rest 21 and its supporting frame 25. The members 62 and the wedges 43 are located at such heights that there is no interference with the turning of the seat 180° back and forth, and that, when fully turned, there will be two points of support, with wedge action effect, at each end of the seat when the seat is facing in either direction.

From the above, it will be noted that the construction provides for the revolving of the cushion and back only, the seat ends being fixed similar to the ordinary car seat. The cushion is designed to use only one edge as the front, and the construction permits ten inches or more in the depth of the cushion. The cushion may be made of a different shape than is possible in the ordinary car seat. The back may be shaped similarly to the back of a large comfortable house chair, and may be curved in shape with projecting wings 63 at the top to increase the comfort as a head rest. The back may be fully nine inches thick, thus securing added ease and comfort.

In this form of seat, the cushion and cushion rest 21 should have all four corners beveled or rounded, and the seat ends or arm rest should be curved correspondingly, to eliminate any wide opening between them and the cushion ends.

To revolve the seat, the latch 56 is retracted into the position shown in Fig. 9. The seat back is then pushed forward until its top comes in line with the center of the cushion longitudinally, as shown in dot and dash lines in Fig. 3. The stop 61 prevents movement past this position. Since the seat back is usually tilted by trainmen grasping the top of the seat back at the aisle end, a continuation of the push against the back will cause the seat to revolve, and the trainman continues to revolve the seat until it is facing in the opposite direction. When the seat arrives at the proper position, the wedges 43 will come into wedging engagement with the stop and supporting pieces 62, and thus the ends of the cushion rest 21 will become supported automatically, to the relief of the center of the construction. By supporting the cushion from the ends, all tendency of the seat to teeter is avoided. The seat back is then lowered into its natural position, and since the outer edge of the latch 56 is suitably beveled, as at 64, this latch will automatically engage in the aperture 52 of the adjacent standard 51 and hold the seat in this position.

As a modification (Fig. 10) of the above construction, instead of providing ball bearings between the cushion rest 21 and the frame 25, the ball bearings may be eliminated, and studs 70 may be secured to the underside of cushion rest 21, having rounded ends sliding in a suitable groove 71 formed in a plate 72, which is secured to the frame 25.

As another modification (Fig. 11), instead of mounting the king pin or stud 24 on the frame 25 so as to extend through a perforation in the cushion rest 21, a pin 75 may be secured to the underside of the cushion rest 21, as by means of a plate or yoke 76, which is secured thereto and confines the head 77 of the pin 75 thereagainst, and the frame 25 may be provided with a perforation 78, in which this pin 75 is rotatably located.

As a further modification, the seat cushion and cushion rest may be arranged to not only rotate, but also to shift bodily on the frame 25 away from an adjoining seat. This modification may be provided with the king pin secured to the cushion rest, or with the king pin secured to the frame.

In Figs. 14 and 15, the king pin or stud 80 is secured to the frame 25, and instead of extending through a round hole in the cushion rest 21, is disposed in a slot 81, which extends longitudinally of the cushion rest. The frame 25 in this instance is provided with a slot 82 extending halfway around the pin 80, and in which slides a pin 83, which is secured to the cushion rest 21. The slot 82 is of such shape that as the cushion rest 21 revolves about the pivot 80 the engagement of pin 83 in the slot 82 will move the slot 81 across the pin 80 and take the cushion rest, together with the cushion and seat back thereon, away from an adjacent seat. This movement is diagrammatically illustrated in Fig. 13.

This construction can be modified as shown in Figs. 16 and 17, by having both pin 83 and the king pin or stud 90 attached to the cushion rest 21. In this case, the frame 25 will have a slot 91, in which the pin 90 engages. In this case, however, the slot 91 is disposed transversely of the seat, instead of longitudinally, as is the case when the slot is in the cushion rest 21.

In the type of seats which shift bodily away from an adjoining seat, the seat may be steadied and prevented from teetering during turning by securing to the cushion rest an annular flanged plate 95, which seats beneath flanges 96 of plates 97 secured to the stationary frame 25.

As an accessory to seats of any of the modifications described, foot rests may be provided. These foot rests may be of any convenient or suitable type, such as a rail 98 extending between the car wall and the pedestal 30. However, in accordance with my invention, at each side of the frame 25 I may secure a pair of brackets 90, and pivot to each bracket an arm 91, which is secured to one end of a footrail 92, so that there will be a foot rest at each side of the seat. Since only the foot rest which happens to be beneath the back of the seat is used, the other one may be folded out of the way, as shown in Fig. 3. When folded up, the footrail passes beyond the pivot point 93, so that it will stay in place of itself, but may be easily lowered when the seat is turned to face in the opposite direction. Suitable stop lugs 94 are provided, which prevent the footrails from falling too low. They will remain in place by gravity.

From the above description, it will be apparent that a car seat may be constructed in accordance with my invention which meets all the problems noted above, and in particular embodies maximum ease and comfort, as well as attractiveness in appearance, steadiness and sturdiness, without reducing the seating capacity of ordinary passenger coaches, and at the same time permits the seats to be faced in either direction so that all passengers may ride either forward or backward, as their fancy dictates. Other advantages will be readily apparent to those skilled in the art.

In view of the fact that my invention, as above disclosed, is capable of many modifications without departing from the scope of my invention, it is to be understood that all matter contained in the above description or shown in the accompanying drawings shall be interpreted as illustrative and not in a limiting sense.

What I claim is:—

1. The combination with two stationary end members, of a supporting frame therebetween, a cushion rest mounted on said supporting frame for rotation between said end members, and means whereby the ends of said cushion rest are supported on said end members whenever the cushion rest is revolved to face in either of two opposite directions, said means including wedges on the cushion rest engaging in tapered recesses on the end members.

2. The combination with two stationary end members, of a supporting frame therebetween, a cushion rest mounted on said supporting frame for rotation between said end members, and means whereby the ends of said cushion rest are supported on said end members whenever the cushion rest is revolved to face in either of two opposite directions, said means including tapered projections at different heights on the ends of the cushion rest engaging in tapered recesses located on the end members at heights corresponding to the heights of the projections.

3. The combination with two stationary end members, of a supporting frame therebetween, a cushion rest mounted on said supporting frame for rotation between said end members, and means whereby the ends of said cushion rest are supported on said end members whenever the cushion rest is revolved to face in either of two opposite directions, said means including diamond-shaped wedges on the cushion rest and Z- shaped plates on the end members providing tapered recesses for said wedges, some of said wedges and plates being at different heights than others, whereby certain of said wedges may pass by certain of said plates to permit revolution of the seat in an arc of 180 degrees.

4. The combination with a stationary seat end, of a supporting frame, a cushion rest, back standards pivoted to said cushion rest, one at each end thereof, and a seat back secured to said standards, said cushion rest being rotatably mounted on the supporting frame, whereby either back standard may be brought adjacent the stationary seat end, and latch means on the stationary seat end member engageable with either back standard when adjacent thereto, to latch the standard against being pivoted on the cushion rest and to prevent the seat back against being tilted, when the seat is facing in either of two opposite directions.

5. The combination with a car wall and an aisle end, of a supporting frame extending between and secured to said wall and aisle end, a cushion rest, approximately as long as the space between the car wall and aisle end, mounted for rotation on the supporting frame, a cushion approximately as long as the cushion rest mounted thereon for rotation therewith, wedge recesses on the car wall and aisle end, wedges on the cushion rest ends engaging in said recesses when said cushion rest is faced in either direction parallel to the car wall, whereby the seat cushion is supported at its ends, and interengaging flange members on the cushion rest and supporting frame whereby the seat cushion is steadied on the support in intermediate positions of rotation.

6. In a reversible car seat of the character described, in combination, a support, a cushion rest rotatably mounted on said support, and stationary means at each end of the seat coacting with means at each end of the cushion rest and movable therewith to confine both ends of the cushion rest individually against upward displacement when the seat is facing in either of its reversible seating positions.

7. In a reversible car seat of the character described, in combination, a support, a cushion rest rotatably mounted on said support, and stationary means at each end of the seat coacting with means at each end of the cushion rest and movable therewith to confine both ends of the cushion rest individually against upward and downward displacement when the seat is facing in either of its reversible seating positions.

8. In a reversible car seat of the character described, in combination, a support, a cushion rest rotatably mounted on said support, projections carried on each end of the cushion rest, and members at each end of the seat having recesses into which said projections ride at both ends of the seat as the cushion rest is rotated into seating position and in which the projections are closely confined both from above and from below at both ends of the seat when the cushion rest is facing in either of its reversible seating positions.

9. In a reversible car seat of the character described, in combination, a support, a cushion rest rotatably mounted on said support, wedge-shaped projections carried on each end of the cushion rest, and members at each end of the seat having wedge-shaped recesses into which said projections ride at both ends of the seat as the cushion rest is rotated into seating position and in which the projections are closely confined both from above and from below at both ends of the seat when the cushion rest is facing in either of its reversible seating positions.

10. In a reversible car seat of the character described, in combination, a support, a cushion rest rotatably mounted on said support, and means comprising extended flanged members on the support intermediate the ends of the seat overlapping extended arcuate members carried on the cushion rest for rotation therewith to confine the cushion rest against rocking movement on the support when the seat is in intermediate positions of rotation, said arcuate members being both rotatable and shiftable with respect to said flanged members while overlapped thereby.

11. In a reversible car seat of the character described, in combination, a support, a cushion rest mounted for rotation and bodily shifting movement on said support, and means whereby, during reversing rotation of the cushion rest, the cushion rest is shifted bodily relatively to said support, a flange formation of circular aspect on the cushion rest and rotatable therewith, and a pair of flanged members on the support on opposite sides of the center point of the seat overlapping said flange formation, said flange formation being both rotatable and shiftable with respect to said flanged members while overlapped thereby, said flange formation and flanged members coacting to prevent rocking movement of the cushion rest as the seat is reversed.

12. In a reversible car seat of the character described, in combination, a support, a cushion rest mounted for rotation and bodily shifting movement on said support, means whereby, during reversing rotation of the cushion rest, the cushion rest is shifted bodily relatively to said support, a flange formation of circular aspect on the cushion rest and rotatable therewith, a pair of flanged members on the support on opposite sides of the center point of the seat overlapping said flange formation, said flange formation being both rotatable and shiftable with respect to said flanged members while overlapped thereby, said flange formation and flanged members coacting to prevent rocking movement of the cushion rest as the seat is reversed, and stationary means at each end of the seat coacting with means at each end of the cushion rest and movable therewith to confine both ends of the cushion rest individually against upward and downward displacement when the seat is facing in either of its reversible seating positions.

13. In a car seat of the character described, in combination, a support, a cushion rest rotatably mounted on the support, means for confining both ends of the cushion rest individually against upward and downward displacement when the seat is facing in either seating position, said means including stationary elements at each end of the seat adapted to be engaged by elements at each end of the cushion rest and movable therewith, and means whereby the cushion rest is confined against rocking movement on the support and including a member disposed on the support intermediate the ends of the seat and a coacting member carried centrally on the cushion rest for rotation therewith.

This specification signed this 21st day of June, 1926.

JOHN B. KILBURN.